United States Patent [19]

Katagiri

[11] Patent Number: 4,893,016
[45] Date of Patent: Jan. 9, 1990

[54] GAS-COOLED SEMICONDUCTOR RADIATION DETECTOR

[75] Inventor: Masaki Katagiri, Ibaraki, Japan

[73] Assignee: Japan Atomic Energy Research Institute, Tokyo, Japan

[21] Appl. No.: 247,432

[22] Filed: Sep. 12, 1988

Related U.S. Application Data

[63] Continuation of Ser. No. 10,468, Feb. 3, 1987, abandoned.

[30] Foreign Application Priority Data

Apr. 2, 1986 [JP] Japan .................................. 61-22754

[51] Int. Cl.⁴ .............................................. G01T 1/24
[52] U.S. Cl. ........................... 250/370.09; 250/370.15
[58] Field of Search ............... 250/352, 370.15, 370.09; 62/514 JT, 514 R, 414, 475

[56] References Cited

U.S. PATENT DOCUMENTS

| | | | |
|---|---|---|---|
| 3,063,260 | 11/1962 | Dennis | 62/514 JT |
| 3,280,593 | 10/1966 | Konkel | 62/514 R |
| 3,942,010 | 3/1976 | Peterson et al. | 250/370 L |
| 3,983,714 | 10/1976 | Fletcher et al. | 62/514 JT |
| 4,178,775 | 12/1979 | Smetana | 250/352 |
| 4,456,826 | 6/1984 | Forster | 250/370.09 |
| 4,479,367 | 10/1984 | Buller | 62/514 R |

FOREIGN PATENT DOCUMENTS 1330837 9/1973 United Kingdom ............ 62/514 JT

OTHER PUBLICATIONS

Knoll, Radiation Detection and Measurement, John Wiley and Sons (1979), pp. 420–425.
Behar et al., "A Cryostat for Medical Imaging by a Superheated, Superconducting X—Ray Detector", Cryogenics, Jun. (1980), pp. 341–344.
Alberti et al., "A New Gas—Cooled Ge(I) and Si(Li) High Resolution Miniprobe", Nuclear Instruments and Methods 158, (1979), North—Holland Publishing Co., pp. 425–428.

Primary Examiner—Janice A. Howell
Assistant Examiner—Richard Hanig
Attorney, Agent, or Firm—Browdy and Neimark

[57] ABSTRACT

A semiconductor radiation detector is equipped with a semiconductor detection device such as silicon or germanium and is used in qualitative and quantitative analysis of X-rays or gamma-rays while the detection device is cooled with a refrigerator that makes use of the adiabatic expansion of air or nitrogen gas being released from an adiabatic expansion valve. In accordance with the present invention, the periphery of the gas outlet of the adiabatic expansion valve at the tip of the refrigerator is covered with a gas-permeable fibrous or screen-like material or with a laminate of two or more perforated plates. This construction ensures a passage of gas flow and yet reduces the air vibration that would otherwise occur when the gas is released from the adiabatic expansion valve. The detector of the present invention provides an energy resolution that is just comparable to the value attained when the detector is cooled directly with liquid nitrogen.

1 Claim, 3 Drawing Sheets

GAS-COOLED SEMICONDUCTOR RADIATION DETECTOR

This application is a continuation of application Ser. No. 010,468 filed Feb. 3, 1987, now abandoned.

BACKGROUND OF THE INVENTION

The present invention relates to a semiconductor radiation detector that is capable of high energy resolution with a semiconductor detection device such as silicon or germanium which can be cooled to a temperature in the neighborhood of the temperature of liquid nitrogen with a refrigerator that makes use of the adiabatic expansion of air or nitrogen gas (said refrigerator is hereinafter referred to as an adiabatic expansion effect refrigerator).

Semiconductor radiation detectors that are capable of high energy resolution with a semiconductor detection device such as silicon or germanium have heretofore been used in qualitative and quantitative analyses of X-rays or gamma-rays. As shown in FIG. 1, the semiconductor radiation detection device 3 is conventionally cooled with liquid nitrogen 2 in a cooling vessel 1. One problem with this system is that the need to handle liquid nitrogen renders the operation and maintenance of the detector quite time-consuming and cumbersome. In addition, because of the limits on the efforts to reduce the size of the cooling vessel, much difficulty is involved in making the detector compact; for instance, when the detector is completely shielded so as to enable its use in a strong radioactive field, the overall size of the detection equipment including the shield is inevitably increased.

FIG. 2 shows a system of radiation ray detector that has been proposed to enable its cooling in the absence of liquid nitrogen and which features a potential for size reduction. This system is designed to cool the semiconductor detection device 9 with a refrigerator 6 that makes use of the adiabatic expansion of gases. As shown, the pressure of air or nitrogen supplied from a cylinder 14 is lowered with a reducing valve unit 13 and, after being passed through a filter 11 to have any impurities removed, the gas is permitted to flow through an adiabatic expansion effect refrigerator 6 so as to cool the detection device 9. The refrigerator used in this system can be made sufficiently smaller in size to render the overall detector system compact.

However, if the flow rate of gas supplied to the detector system shown in FIG. 2 is increased, the gas being released through the adiabatic expansion valve 7 causes an increased amount of air vibration in the cooling section and this will reduce the energy resolution of the detector.

SUMMARY OF THE INVENTION

An object, therefore, of the present invention is to provide a gas-cooled semiconductor radiation detector that will undergo minimum deterioration of energy resolution, and this object is achieved by reducing the air vibration that results from increased gas release at the adiabatic expansion valve.

DETAILED DESCRIPTION OF THE INVENTION

Figure 1:
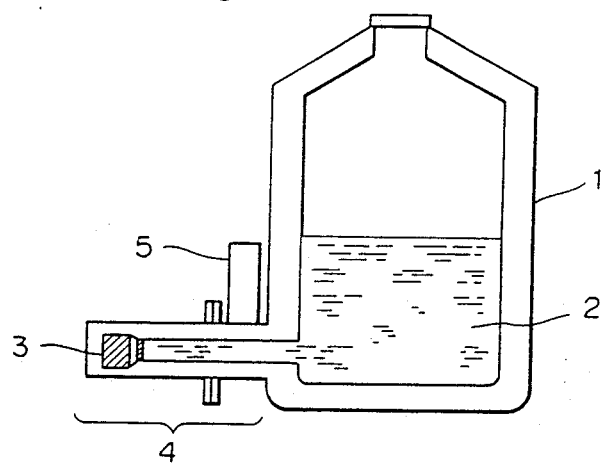
FIG. 1 shows a conventional semiconductor radiation detector that uses liquid nitrogen to cool the detective device.
Figure 3:
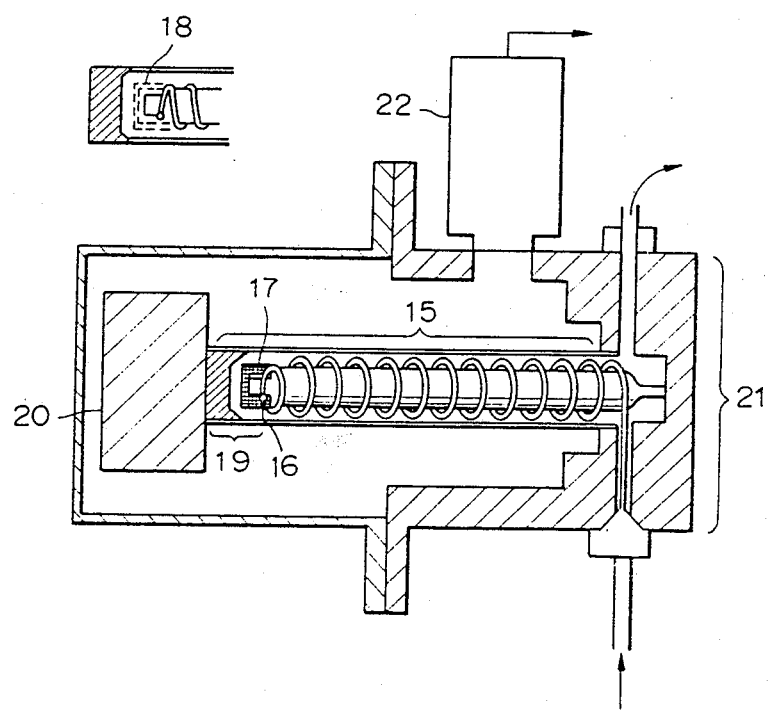
FIG. 3 shows a semiconductor radiation detector that uses the adiabatic expansion effect refrigerator of the present invention.
Figure 2:
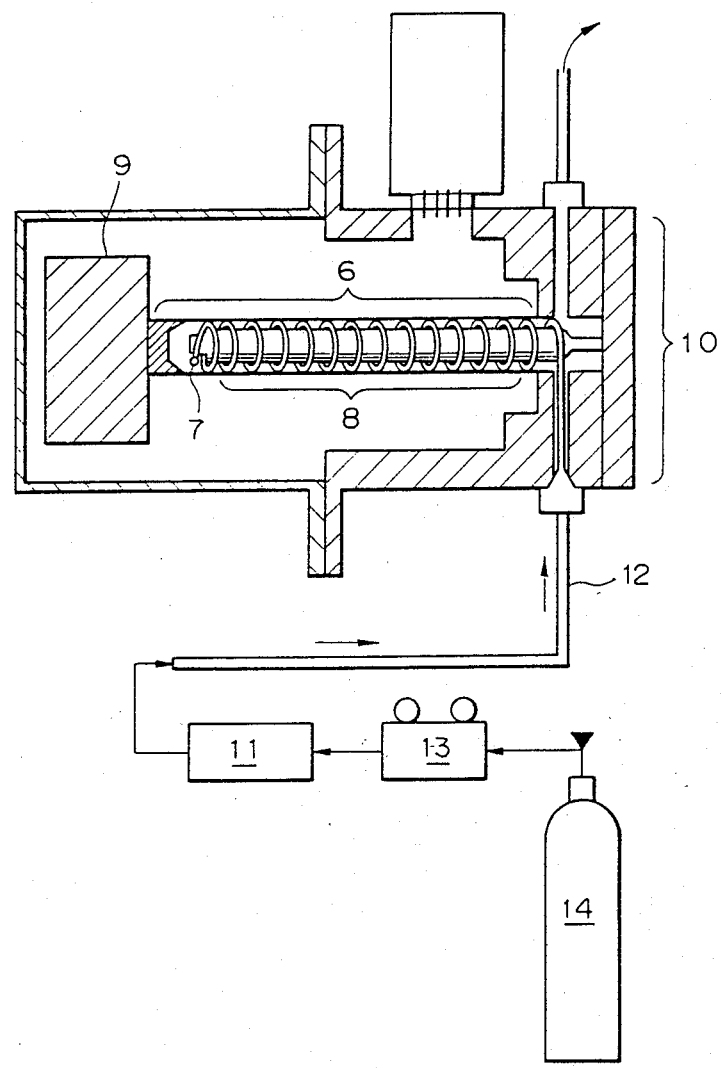
FIG. 2 shows a conventional semiconductor radiation detector that uses an adiabatic expansion effect refrigerator to cool the detection device.

FIG. 3 is a schematic drawing of the gas-cooled semiconductor radiation detector of the present invention. The present inventors found that the microphonic noise of ultrasonic waves was produced when the gas released from an adiabatic expansion effect refrigerator 15 at an adiabatic expansion valve 16 impinged on the side wall of a cooling section 19. The present invention has been accomplished by eliminating direct impinging of the released gas against the side wall of the cooling section 19. The tip of the refrigerator used in the system of the present invention has the construction shown in FIG. 3, wherein the periphery of the gas outlet of the adiabatic expansion valve on the refrigerator is covered with a gas-permeable fibrous or screen-like material 17 such that the gas released from the expansion valve will flow smoothly without being directly blown against the side wall of the cooling section. The fibrous or screen-like material 17 not only provides a passage for the released gas but also enables the liquid air or nitrogen produced by adiabatic expansion to attain direct contact with the cooling section so as to prevent any deterioration of the cooling capacity of the refrigerator. Equally good results can be attained by using a laminate of perforated plates 18 in place of the fibrous or screen-like material 17.

If a semiconductor radiation detector is used with the refrigerator having the construction described above, the air vibration that would occur in the cooling section can be reduced and yet the detector is capable of attaining an energy resolution which is comparable to that achieved when the detector is cooled with liquid nitrogen from a cooling vessel.

Figure 4:
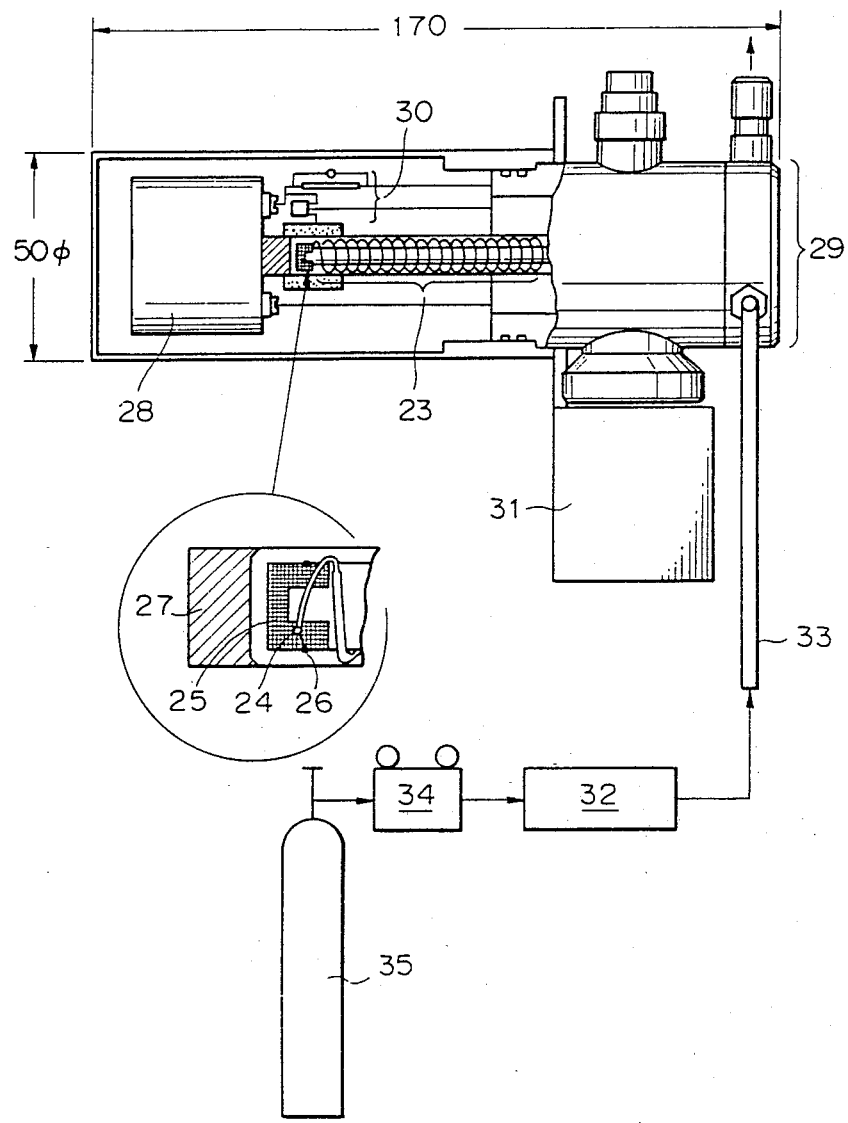
FIG. 4 shows one embodiment of a semiconductor radiation detector that uses the adiabatic expansion effect refrigerator of the present invention.

FIG. 4 shows a preferred embodiment of the present invention as it is applied to a semiconductor gamma-ray detector that uses germanium as a semiconductor detection device. The detector uses an adiabatic expansion effect refrigerator 23 that has a cooling capacity of 7 watts at the temperature of liquid nitrogen and which measures 9 mm in diameter and 100 mm in length. The periphery of the gas outlet of an adiabatic expansion valve 24 at the tip of the refrigerator is covered with a 2-mm thick sheet 25 of cotton fibrous pretreated gauze (Bencot®) which is placed in position with a thin wire 26. This refrigerator is used to cool a high-purity germanium detection device 28 having a volume of 12 cm$^3$. A small output signal produced from the detection device is sent to signal processing equipment after being amplified first in a charge-sensitive signal amplifying initial-stage circuit 30 composed of a field-effect transistor (FET), a resistor and a capacitor, then in a signal amplifier 31. Both the circuit 30 and the amplifier 31 are assembled with the detector.

When nitrogen gas supplied to the detector system at an average flow rate of 25 liters/min from a supply unit composed of a cylinder 35, a reducing valve 34, a filter 32 and a conduit 33, the detection device 28 was cooled to the temperature of liquid nitrogen in about 60 minutes and this temperature could be kept in subsequent stage by permitting nitrogen gas to flow at a rate of 12 liters/min. The use of cotton gauze 25 around the adiabatic expansion valve 24 had no adverse effect on the cooling capacity of the refrigerator 23. While being cooled in this state, the detector was capable of detecting gamma-rays of 662 keV to an energy resolution of as small as 1.8 keV, which was comparable to the value attained when the detector was cooled directly with liquid nitrogen. When the same experiment was conducted under the same conditions using a conventional adiabatic expansion effect refrigerator, an energy resolution of 3.2 keV was attained. By comparing the two values of energy resolution, one will readily see the superiority of the present invention.

As described above, the refrigerator used in the present invention is characterized in that the periphery of the gas outlet of the adiabatic expansion valve at the tip of the refrigerator is covered with a gas-permeable fibrous or screen-like material or with a laminate of two or more perforated plates. Whichever material is used, a passage of gas flow is provided and the air vibration that would otherwise occur in the cooling section of the refrigerator can be reduced. In addition, the cooling capacity of the refrigerator is just as high as that attainable by the conventional method of using liquid nitrogen in a cooling vessel since the liquid air or nitrogen produced by adiabatic expansion of supplied gas is brought into direct contact with the cooling section.

What is claimed is:

1. In a gas-cooled semiconductor detection system for detecting gamma rays while a semiconductor detection device is cooled to a temperature in the neighborhood of the temperature of liquid nitrogen with a refrigerator that is composed of an adiabatic expansion valve, a heat exchanger and a cooling section and which makes use of the adiabatic expansion of air or nitrogen gas, the improvement wherein a gas-permeable fibrous or screen-like material such as cotton wool, gauze or felt envelopes the periphery of the gas outlet of said adiabatic expansion valve located at the tip of the refrigerator in direct contact therewith such that air vibrations which occur in a space between said adiabatic expansion valve and said cooling section when a gas is released from the adiabatic expansion valve and mechanical vibrations which occur when the gas directly collides with the cooling section are sufficiently damped thereby to improve the energy resolution of the spectrometry of gamma rays that is attainable by the gamma rays detection system.

* * * * *

UNITED STATES PATENT AND TRADEMARK OFFICE
CERTIFICATE OF CORRECTION

PATENT NO. : 4,893,016
DATED : January 9, 1990
INVENTOR(S) : KATAGIRI

It is certified that error appears in the above-identified patent and that said Letters Patent is hereby corrected as shown below:

On the title page:

Item, [30] Foreign Application Priority Data:

Delete "Apr. 2, 1986", insert therefor -- Feb. 4, 1986 --

Signed and Sealed this

Fourteenth Day of January, 1992

Attest:

HARRY F. MANBECK, JR.

*Attesting Officer*  *Commissioner of Patents and Trademarks*